US012638555B2

(12) United States Patent
Yamamoto

(10) Patent No.: US 12,638,555 B2
(45) Date of Patent: May 26, 2026

(54) RANGING APPARATUS

(71) Applicant: DENSO CORPORATION, Kariya-city (JP)

(72) Inventor: Masahiro Yamamoto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 1207 days.

(21) Appl. No.: 17/399,866

(22) Filed: Aug. 11, 2021

(65) Prior Publication Data

US 2021/0373134 A1 Dec. 2, 2021

Related U.S. Application Data

(63) Continuation of application No. PCT/JP2020/005328, filed on Feb. 12, 2020.

(30) Foreign Application Priority Data

Feb. 13, 2019 (JP) ................................. 2019-023589

(51) Int. Cl.
*G01S 7/481* (2006.01)
*G01S 17/08* (2006.01)
*G01S 17/931* (2020.01)

(52) U.S. Cl.
CPC .......... *G01S 7/4813* (2013.01); *G01S 7/4814* (2013.01); *G01S 17/08* (2013.01); *G01S 17/931* (2020.01)

(58) Field of Classification Search
CPC ................................. H05B 3/18; G01S 7/4813
See application file for complete search history.

(56) References Cited

U.S. PATENT DOCUMENTS

2009/0275820 A1 11/2009 Miwa
2011/0281095 A1* 11/2011 Timmermann ......... B60R 11/04
428/215

(Continued)

FOREIGN PATENT DOCUMENTS

CN          102262225 A      11/2011
JP          05-157830 A       6/1993
(Continued)

OTHER PUBLICATIONS

Machine translation of JP-2016223948-A (Year: 2016).*
(Continued)

*Primary Examiner* — Yuqing Xiao
*Assistant Examiner* — Zhengqing Qi
(74) *Attorney, Agent, or Firm* — Precision Patents, P.C.

(57) ABSTRACT

A ranging apparatus works to measure a distance to an object and includes an emitter, a receiver, a housing, an optical window, a heater, an outlet hole formed in the housing, a power conductor, and a guide. The housing has the emitter and the receiver disposed therein and also has the optical window formed therein. The heater supplies heat to the optical window. The power conductor connects with the heater and extends outside the housing through the outlet hole. The guide is disposed in the housing and works to guide movement of the power conductor toward the outlet hole. The guide is equipped with a cover which covers at least a portion of the power conductor and is less able to reflect light emitted from the emitter and light reflected from the object than the power conductor.

3 Claims, 9 Drawing Sheets

(56) References Cited

U.S. PATENT DOCUMENTS

| 2014/0320845 | A1* | 10/2014 | Bayha | ..................... | B29C 70/72 |
| | | | | | 356/5.03 |
| 2016/0238444 | A1* | 8/2016 | Chu | ....................... | A61B 5/681 |
| 2017/0167868 | A1 | 6/2017 | Hirai | | |
| 2017/0352938 | A1 | 12/2017 | Okumura et al. | | |
| 2019/0146066 | A1* | 5/2019 | Kunze | .................. | G01S 7/4813 |
| | | | | | 356/5.01 |
| 2020/0100367 | A1* | 3/2020 | Antaya | .................. | G01S 7/027 |
| 2021/0373134 | A1 | 12/2021 | Yamamoto | | |
| 2022/0003848 | A1 | 1/2022 | Yamamoto | | |

FOREIGN PATENT DOCUMENTS

| JP | 09186367 | A | * | 7/1997 | ............. | B41J 2/451 |
| JP | 2005-149578 | A | | 6/2005 | | |
| JP | 5961065 | B2 | * | 8/2016 | | |
| JP | 2016223948 | A | * | 12/2016 | | |
| JP | 2017-215242 | A | | 12/2017 | | |
| JP | 2020-153924 | A | | 9/2020 | | |
| JP | 2021-143920 | A | | 9/2021 | | |
| WO | 2020/195678 | A1 | | 10/2020 | | |

OTHER PUBLICATIONS

Machine translation of JP-09186367-A (Year: 1997).*

Thorne, accessed from "powerandcables.com/product/cable-glands/" with Wayback Machine dated Dec. 30, 2017 (Year: 2017).*

Machine Translation of JP-5961065-B2 (Year: 2016).*

U.S. Appl. No. 17/930,669 and its entire file history, filed Sep. 8, 2022, Yamamoto.

U.S. Appl. No. 17/479,445 and its entire file history, filed Sep. 20, 2021, Yamamoto.

* cited by examiner

FIG.6

RANGING APPARATUS

CROSS REFERENCE TO RELATED DOCUMENTS

The present application claims the benefit of priority of Japanese Patent Application No. 2019-23589 filed on Feb. 13, 2019, the disclosure of which is incorporated in its entirety herein by reference.

TECHNICAL FIELD

This disclosure generally relates to a ranging apparatus.

BACKGROUND ART

Ranging devices are known which measure a distance to an object. The ranging device works to emit a light beam. The light beam is reflected on the object to produce reflected light. The ranging device receives the reflected light and calculate the distance to the object as a function of a difference in time between when the light beam is emitted and when the reflected light is received.

The ranging device is usually equipped with a housing with an optical window. The light beam and the reflected light pass through the optical window. The ranging device, as disclosed in the patent literature 1, is equipped with a heater which adds heat to the optical window to remove snow or ice from the optical window.

PRIOR ART DOCUMENT

Patent Literature

Patent Literature 1
Japanese translation of PCT internal application publication No. 2015-506459

SUMMARY OF THE INVENTION

The inventor has made a study in detail and found a following problem. Specifically, an emitted light beam may be reflected on the heater to generate stray light in the housing. When the ranging device receives the stray light, it will result in a reduction in ranging performance thereof. It is, therefore, desirable in this disclosure to provide a ranging apparatus capable of minimizing the reduction in ranging performance arising from the stray light.

It is advisable in one aspect of this disclosure to provide a ranging apparatus capable of minimizing a reduction in ranging ability arising from stray light.

According to one aspect of this disclosure, there is provided a ranging apparatus which measures a distance to an object which comprises: (a) an emitter which emits light; (b) a receiver which receives reflected light which arises from reflection of the emitted light on the object; (c) a housing which is configured to have the emitter and the receiver disposed therein; (d) an optical window which is provided in the housing and through which the emitted light and the reflected light are transmissible; (e) a heater which works to supply heat to the optical window; (f) an outlet hole which is formed in the housing; (g) a power conductor which is connected to the heater and extends outside the housing through the outlet hole; and (h) a guide which is disposed in the housing and works to guide the power conductor toward the outlet hole. The guide is equipped with a cover which covers at least a portion of the power conductor and reflects the emitted light and the reflected light less than the power conductor does.

The ranging apparatus according to one aspect of this disclosure works to minimize a reduction in ranging ability thereof caused by stray light.

BRIEF DESCRIPTION OF THE DRAWINGS

FIG. 6 is a perspective view which illustrates structures of a first portion, a power conductor, and a guide.

EMBODIMENT FOR CARRYING OUT THE INVENTION

An embodiment of this disclosure will be described below with reference to the drawings.

First Embodiment

1 Structure of Ranging Apparatus 1

The structure of the ranging apparatus 1 will be described below with reference to FIGS. 1 to 9. The ranging apparatus 1 is engineered to measure a distance between itself and an object. The ranging apparatus 1 is implemented by, for example, a LiDAR device. The ranging apparatus 1 is mounted in, for example, a vehicle. In such a case, the ranging apparatus 1 works to measure a distance between the vehicle and an object existing around the vehicle.

Figure 1:
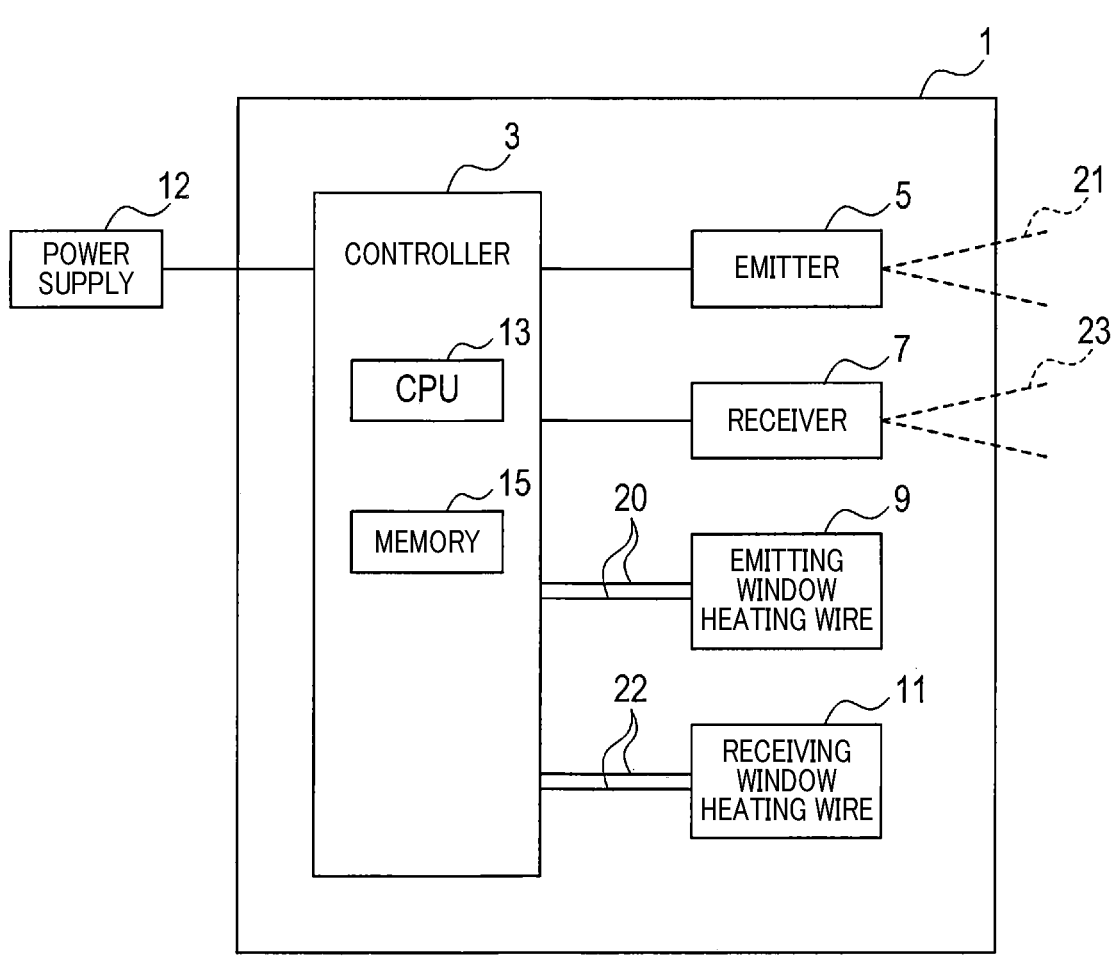
FIG. 1 is a block diagram which shows a structure of a ranging apparatus.

The ranging apparatus 1, as clearly illustrated in FIG. 1, includes the controller 3, the emitter 5, the receiver 7, the emitting window heating wire 9, and the receiving window heating wire 11.

The controller 3 is equipped with a microcomputer made up of the CPU 13 and the semiconductor memory 15, such as a RAM or a ROM.

The controller 3 performs various functions by executing programs using the CPU 13. The programs are stored in a non-transitory computer-readable recording medium. In this embodiment, the memory 15 is a non-transitory computer-readable recording medium which retains the programs therein. The programs are also executed to implement given methods. The controller 3 may be equipped with a single or a plurality of microcomputers.

Figure 2:
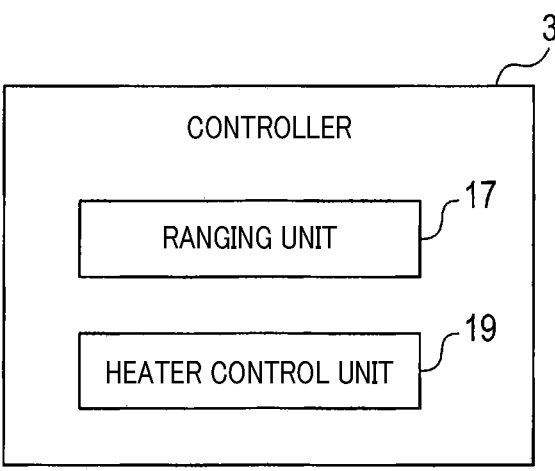
FIG. 2 is a block diagram which shows a functional structure of a controller.

The controller 3, as illustrated in FIG. 2, includes the ranging unit 17 and the heater control unit 19. The controller 3 is, as can be seen in FIG. 1, supplied with electrical power from the external power supply 12. The controller 3 delivers electrical power to the emitting window heating wire 9 using the first power cable 20. The controller 3 also delivers electrical power to the receiving window heating wire 11 through the second power cable 22.

The emitter 5 works to emit the light 21 in the form of a laser beam. The emitted light 21 is infrared light. The receiver 7 receives the reflected light 23 and converts it into an electrical signal. The reflected light 23 is light arising from reflection of the emitted light 21 on an object.

The emitting window heating wire 9 works to add heat to the emitting window 45 which will be described later. The receiving window heating wire 11 works to add heat to the receiving window 47 which will be described later. The addition of heat from the emitting window heating wire 9 to the emitting window 45 removes snow or ice from the emitting window 45. The addition of heat from the receiving window heating wire 11 to the receiving window 47 receives snow or ice from the receiving window 47. The emitting window heating wire 9 and the receiving window heating wire 11 constitute a heater.

Figure 3:
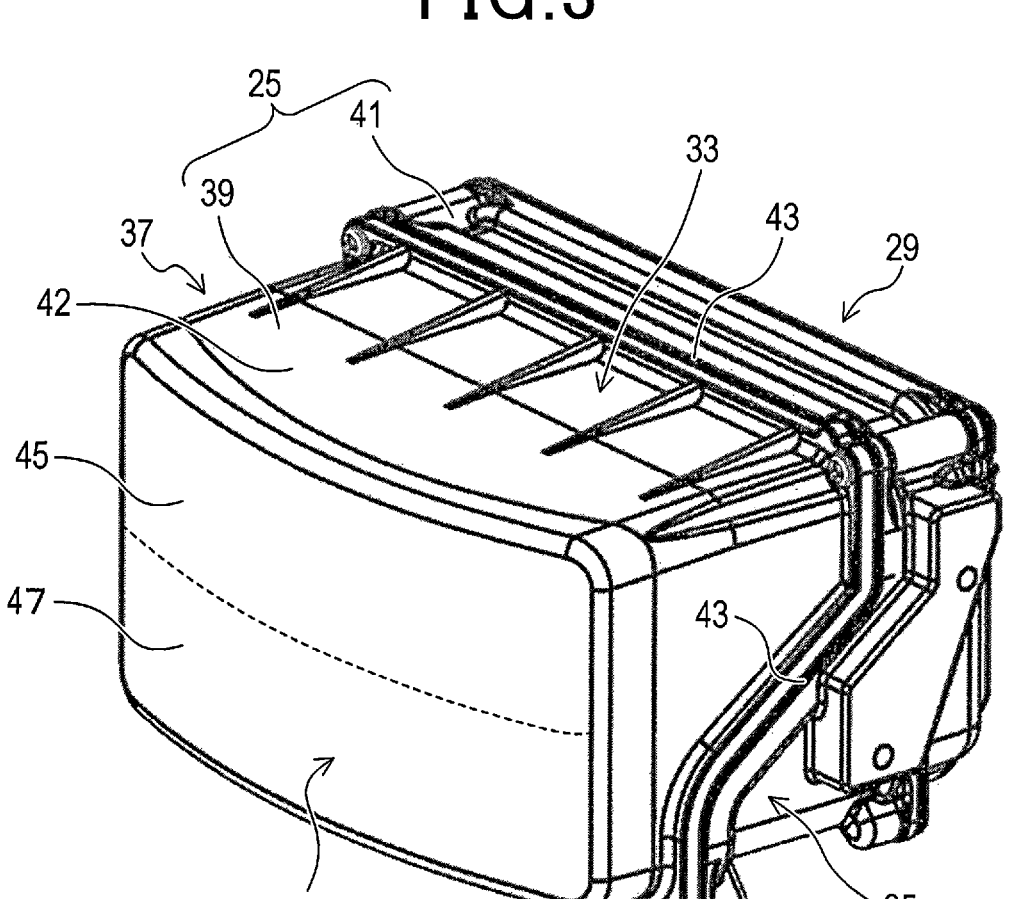
FIG. 3 is a perspective view which illustrates a structure of a housing.

The ranging apparatus 1 is, as illustrated in FIG. 3, equipped with the housing 25. The emitter 5, the receiver 7, the emitting window heating wire 9, and the receiving window heating wire 11 are disposed in the housing 25. The controller 3 is arranged outside the housing 25. The housing 25 is of a cuboid shape. The housing 25 has the front surface 27, the back surface 29, the bottom surface 31, the upper surface 33, the first side surface 35, and the second side surface 37. The emitter 5 is arranged close to the upper surface 33 within the housing 25. The receiver 7 is arranged close to the bottom surface 31 within the housing 25.

The front surface 27 is made from resin through which the emitted light 21 and the reflected light 23 pass. The front surface 27 functions as an optical window. The front surface 27 has a horizontal cross section curved outward in the shape of a convex. The horizontal cross section is a cross section of the front surface 37 extending parallel to the bottom surface 31 and the upper surface 33. The back surface 29, the bottom surface 31, the upper surface 33, the first side surface 35, and the second side surface 37 are made from material through which the emitted light 21 and the reflected light 23 hardly pass.

The housing 25 includes the first portion 39 and the second portion 41. The first portion 39 includes the whole of the front surface 27, a portion of the bottom surface 31, a portion of the upper surface 33, a portion of the first side surface 35, and a portion of the second side surface 37.

The first portion 39 has a portion which occupies the portion of the bottom surface 31, the portion of the upper surface 33, the portion of the first side surface 35, and the portion of the second side surface 37 and forms the frame 42.

The second portion 41 includes the whole of the back surface 29, a portion of the bottom surface 31, a portion of the upper surface 33, a portion of the first side surface 35, and a portion of the second side surface 37. The surface 43 of a joint between the first portion 39 and the second portion 41 extends through the bottom surface 31, the first side surface 35, the upper surface 33, and the second side surface 37. The second portion 41 is made from metal and constitutes a metallic portion.

Figure 4:
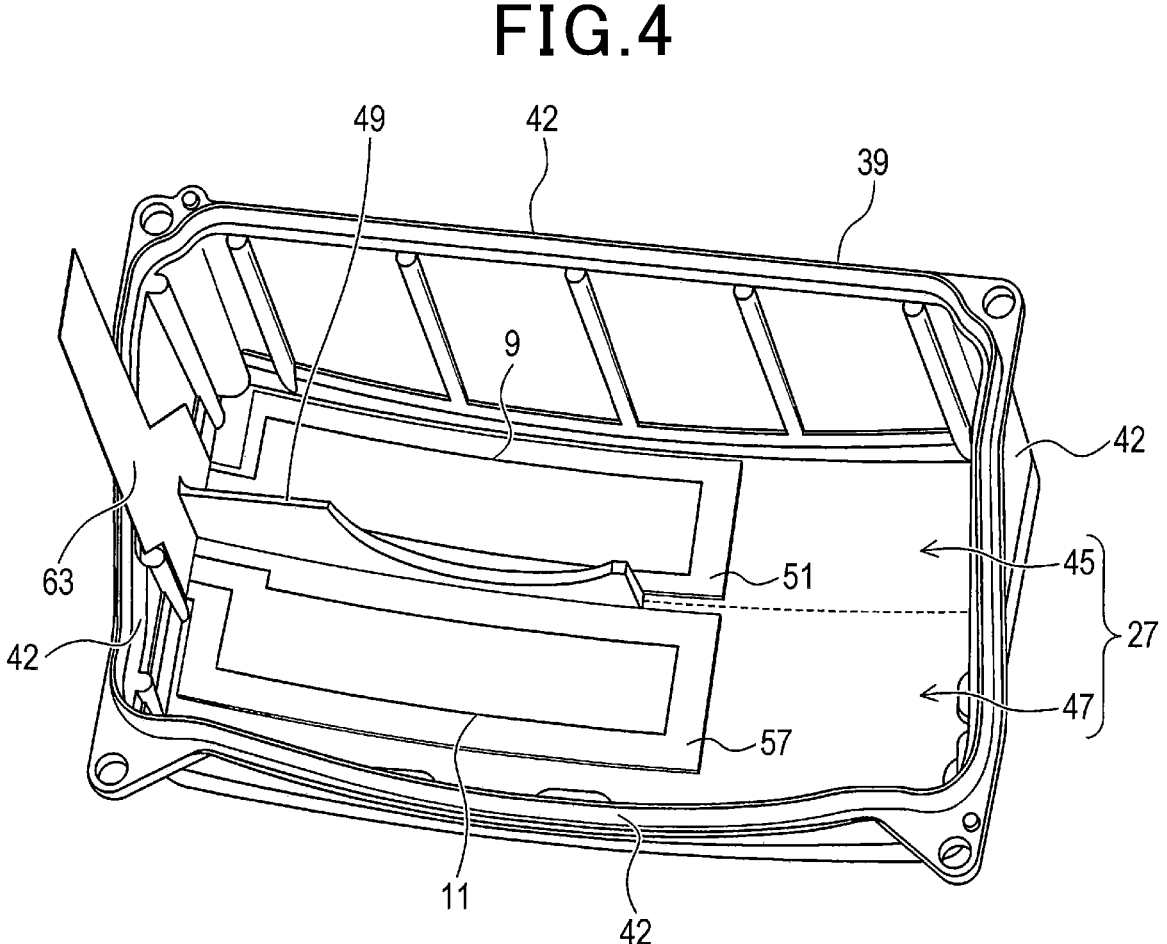
FIG. 4 is a perspective view which illustrates a first portion, as viewed from inside it.

The front surface 27, as illustrated in FIGS. 3 and 4, has the emitting window 45 and the receiving window 47. The emitting window 45 occupies a portion of the front surface 27 which is located close to the upper surface 33. The receiving window 47 occupies a portion of the front surface 27 which is located close to the bottom surface 31.

The front surface 27, as clearly illustrated in FIG. 4, has the shielding plate 49 secured on an inner surface thereof. The inner surface is a portion of an inner surface of the housing 25. The shielding plate 49 is disposed along a boundary between the emitting window 45 and the receiving window 47. The shielding plate 49 extends from the front surface 27 toward the back surface 29. The shielding plate 49 is made from resinous material through which the emitted light 21 and the reflected light 23 hardly transmit. The shielding plate 49 works to stop the emitted light 21, as reflected by the emitting window 45, from traveling toward the receiver 7.

Figure 5:
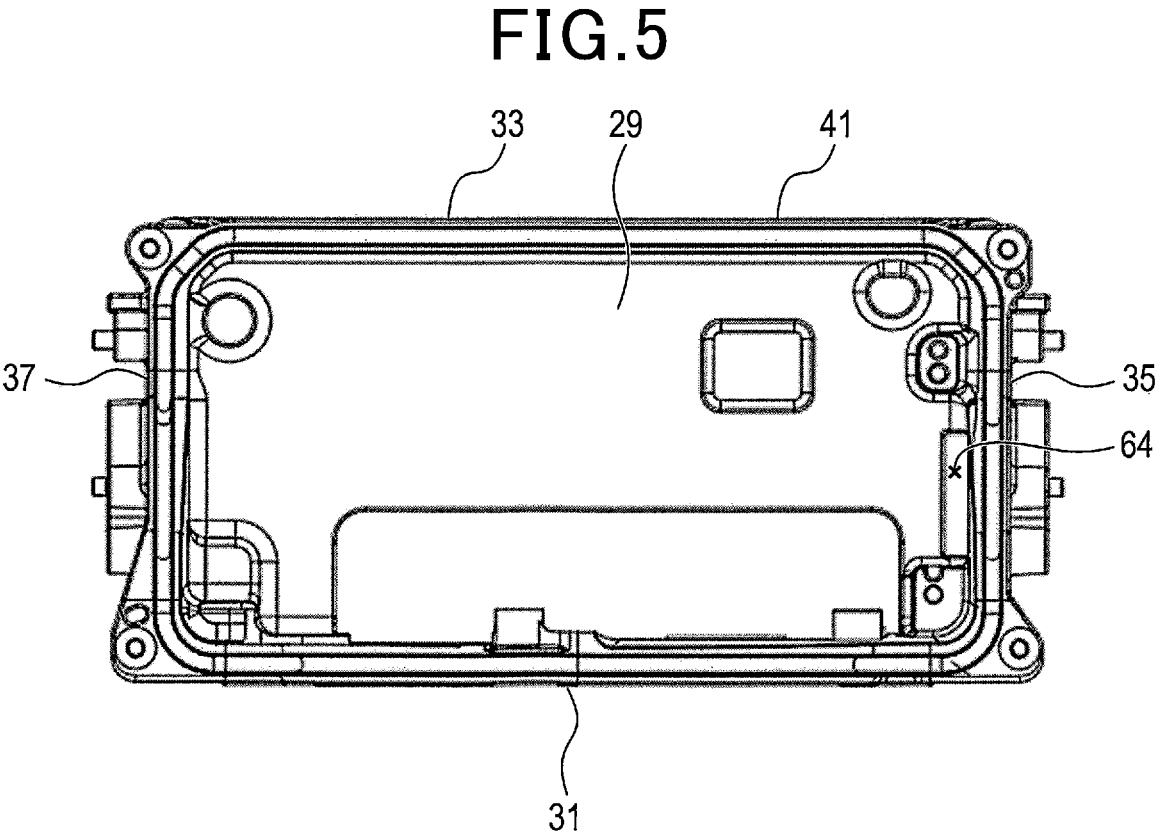
FIG. 5 is an explanatory view which shows a second portion, as viewed from outside a front surface.
Figure 7:
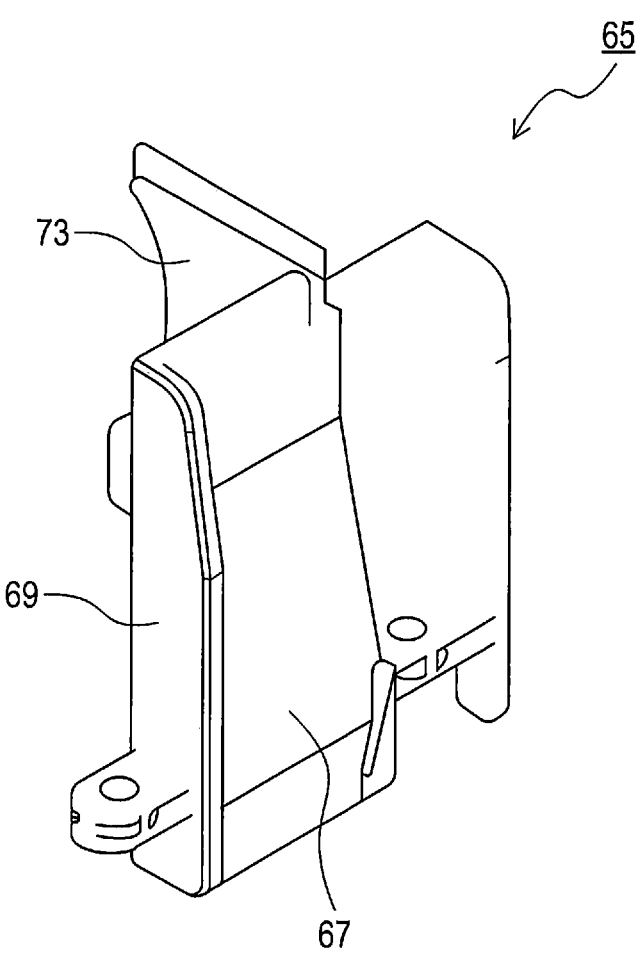
FIG. 7 is a perspective view which illustrates a structure of a guide.
Figure 8:
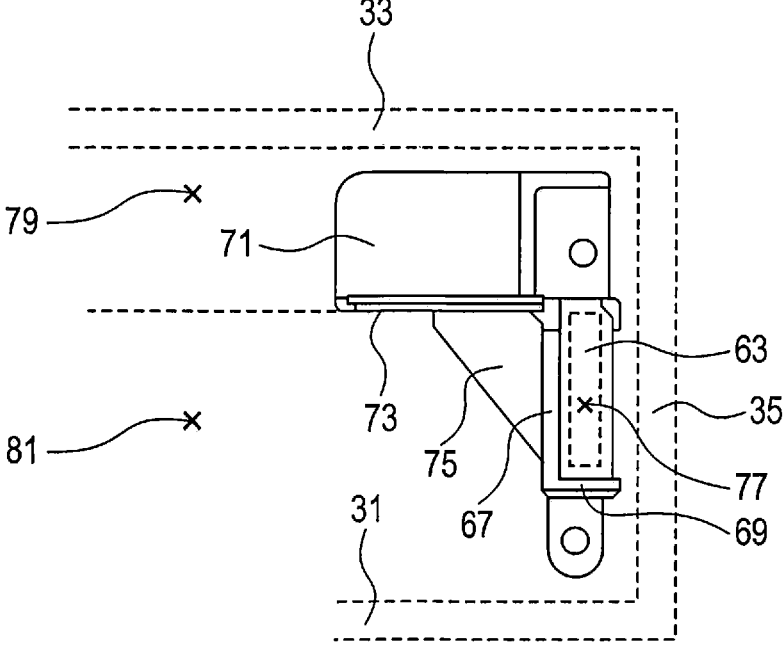
FIG. 8 is an explanatory view which shows a structure of a guide, as viewed from outside a front surface.
Figure 9:
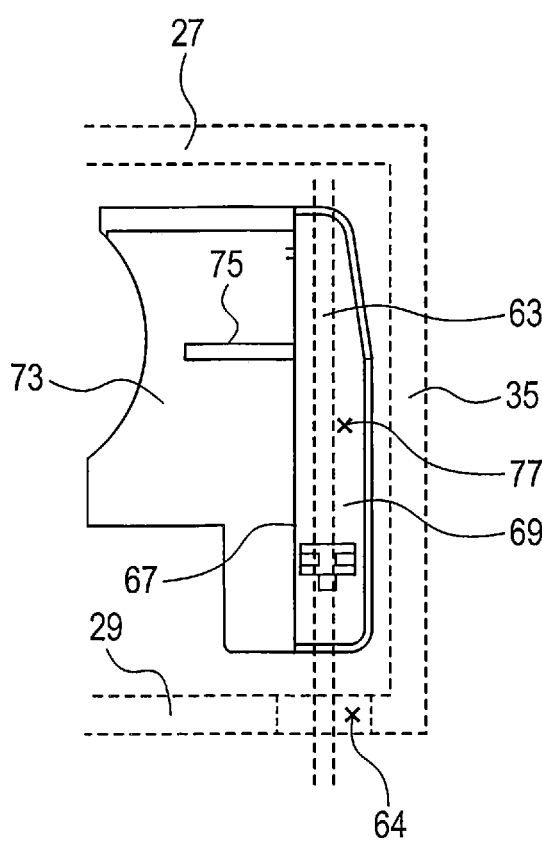
FIG. 9 is an explanatory view which illustrates a structure of a guide, as viewed from outside a bottom surface.

The emitting window 45, as illustrated in FIGS. 4 and 5, has the first transparency film 51 affixed to a portion of the inner surface thereof. The first transparency film 51 is made from resinous material through which the emitted light 21 and the reflected light 23 are transmissive. The first transparency film 51 has the first heater unit 53 secured on an inner surface thereof. The first heater unit 53 is designed to be of a line shape. The first heater unit 53 extends in a rectangular shape on the inner surface of the emitting window 45. The first heater unit 53, as illustrated in FIG. 5, includes the emitting window heating wire 9 and the emitting window covering layer 55. The emitting window heating wire 9 works to heat the emitting window 45.

Figure 6:
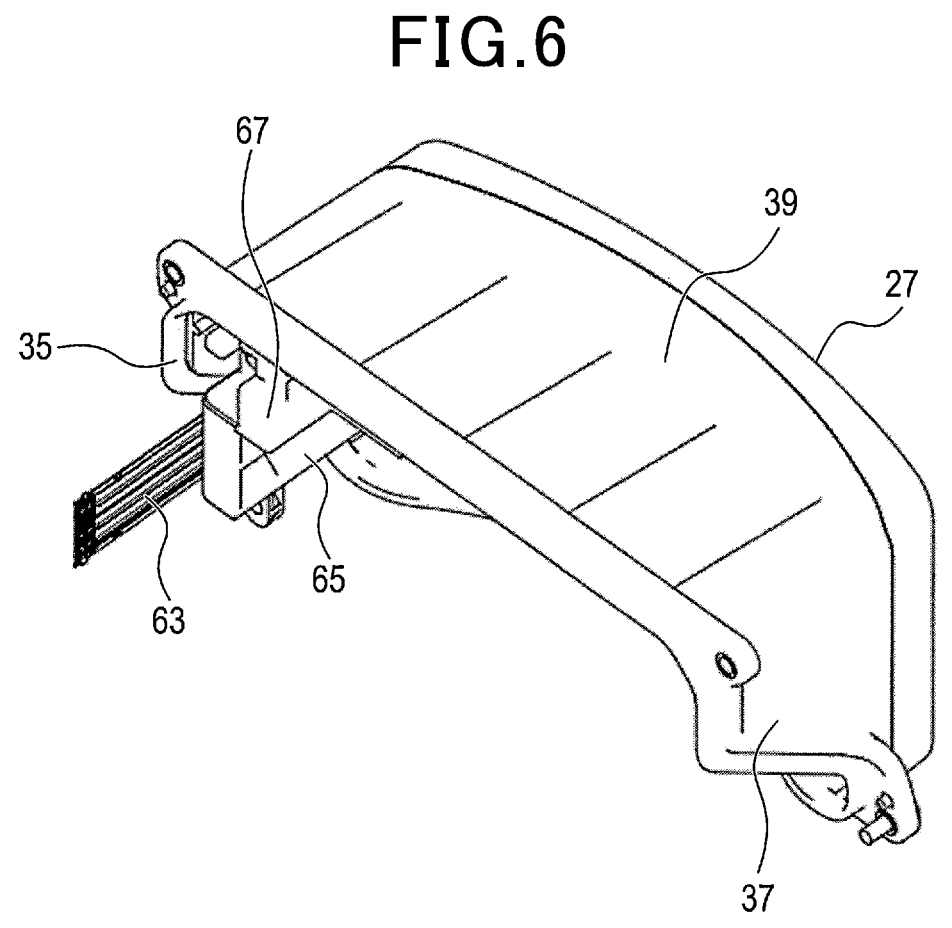

The receiving window 47, as illustrated in FIGS. 4 and 6, has the second transparency film 57 affixed to an inner surface thereof. The second transparency film 57 is made from resinous material through which the emitted light 21 and the reflected light 23 are transmissive. The second transparency film 57 has the receiving window heating wire 11 secured to an inner surface thereof. The receiving window heating wire 11 extends on the inner surface of the receiving window 47 in, for example, a rectangular shape. The receiving window heating wire 11 adds heat to the receiving window 47.

The ranging apparatus 1 is, as illustrated in FIG. 4, equipped with the power conductor 63. The power conductor 63 includes the first power cable 20 and the second power cable 22. The power conductor 63 is connected to the emitting window heating wire 9 and the receiving window heating wire 11 near a boundary between the front surface 27 and the frame 42.

The power conductor 63 extends from the emitting window heating wire 9 and the receiving window heating wire 11 and passes through the housing 25 toward the back surface 29. The back surface 29, as clearly illustrated in FIG. 5, has the outlet hole 64 formed therein. The outlet hole 64 passes through the back surface 29. The outlet hole 64 is located close to the first side surface 35 in the back surface 29. The power conductor 63 extends through the outlet hole 64 outside the housing 25 and connects with the controller 3.

The first power cable 20 of the power conductor 63 connects the controller 3 and the emitting window heating wire 9 together. The second power cable 22 of the power conductor 63 connects the controller 3 and the receiving window heating wire 11 together.

The ranging apparatus 1 is, as illustrated in FIGS. 6 to 9, equipped with the guide 65. The guide 65 is arranged inside the housing 25. The guide 65 is made from material which is less able to reflect the emitted light 21 and the reflected light 23 than the power conductor 63. The guide 65 is made from, for example, resin.

The guide 65 includes the body plate 67, the upright portion 69, the shield 71, the dividing portion 73, and the reinforcing plate 75. The body plate 67 is made of a plate member. The guide 65 is firmly secured to the second portion 41. The guide 65 is not secured to, for example, the first portion 39.

The body plate 67 is made of a plate member. The body plate 67, as clearly illustrated in FIGS. 8 and 9, extends from the front surface 27 to the back surface 29 along the first side surface 35. The upright portion 69 extends from an end of the body plate 67 close to the bottom surface 31 toward the first side surface 35. The upright portion 69 also extends from the front surface 27 to the back surface 29.

The path 77 which is surrounded by the body plate 67, the upright portion 69, and the first side surface 35 serves as a path for the power conductor 63. The path 77 extends from the front surface 27 toward the back surface 29 and reaches the outlet hole 64.

When the first portion 39 is attached to the second portion 41, the front end of the power conductor 63 is first inserted into the path 77 form outside the front surface 27. Subsequently, the power conductor 63 is thrust toward the back surface 29, so that the power conductor 63 moves to the back surface 29 through the path 77. The front end of the power conductor 63 then reaches the outlet hole 64 and passes through the outlet hole 64 outside the housing 25. In this way, the guide 65 serves to guide the movement of the power conductor 63 toward the outlet hole 64.

The body plate 67 and the upright portion 69 cover the power conductor 63 within the path 44. In other words, the body plate 67 and the upright portion 69 serve as a cover. The fact that the body plate 67 and the upright portion 69 covers the power conductor 63 means that the power conductor 63 is arranged behind the body plate 67 and the upright portion 69, as viewed from the center of an inner space of the housing 25.

The shield 71 is made of a plate member connected to the body plate 67. The shield 71 extends parallel to the front surface 27 and the back surface 29. The shield 71 protrudes closer to the second side surface 37 than the body plate 67 does.

The dividing portion 73 is made of a plate member connected to the body plate 67. The dividing portion 73 extends parallel to the bottom surface 31 and the upper surface 33. The dividing portion 73 and the shielding plate 49 lie flush with each other. The dividing portion 73 divides the inside of the housing 25 into the region 79 where the emitting window 45 exists and the region 81 where the receiving window 47 exists.

The reinforcing plate 75 is joined both to the dividing portion 73 and to the body plate 67. The reinforcing plate 75 holds the dividing portion 73 from slanting toward the body plate 67.

2 Tasks Performed by Ranging Apparatus

The ranging unit 17 works to emit the light 21 using the emitter 5. The emitted light 21 passes through the emitting window 45 and travels outside the ranging apparatus 1. A portion of the emitted light 21 is reflected on an object to produce the reflected light 23. A portion of the reflected light 23 passes through the receiving window 47 and travels within the housing 25. The receiver 7 receives the reflected light 23 and converts it into an electrical signal. The receiver 7 then outputs the electrical signal to the ranging unit 17. The ranging unit 17 uses the electrical signal to calculate a distance to the object. The heater control unit 19 controls the degree of electrical energization of the emitting window heating wire 9 and the receiving window heating wire 11.

3 Beneficial Advantages Offered by Ranging Apparatus

1A) The ranging apparatus 1 is equipped with the guide 65.

The body plate 67 and the upright portion 69 which are made of a portion of the guide 65 surrounds or covers the power conductor 63. The body plate 67 and the upright portion 69 are less able to reflect the emitted light 21 and the reflected light 23 than the power conductor 63. The ranging apparatus 1, therefore, minimizes a risk that the emitted light 21 and the reflected light 23 may be reflected on the power conductor 63. In other words, the ranging apparatus 1 functions to deter the occurrence of stray light within the housing 25, thereby minimizing a reduction in ranging ability of the ranging apparatus 1 arising from the stray light.

1B) The guide 65 is equipped with the shield 71. The shield 71 works to block light traveling from the emitting window 45 or the receiving window 47 toward the metallic second portion 41. The ranging apparatus 1, therefore, eliminates a risk that the emitted light 21 or the reflected light 23 may be reflected on the metallic second portion 41. This minimizes a reduction in ranging ability of the ranging apparatus 1 resulting from the stray light.

1C) The guide 65 is equipped with the dividing portion 73. The dividing portion 73 is located to isolate between the region 79 where the emitting window 45 exists and the region 81 where the receiving window 47 exists. The dividing portion 73 serves to block stray light traveling from the region 79 where the emitting window 45 exists to the region 81 where the receiving window 47 exists. The dividing portion 73 also block stray light from the region 81 where the receiving window 47 exists to the region 79 where the emitting window 45 exists. The ranging apparatus 1, therefore, minimizes a reduction in ranging ability caused by the stray light.

Other Embodiments

The above discussion has referred to the embodiments in this disclosure, but however, this disclosure is not limited to the above embodiments and may be realized in various ways without departing from the principle of the disclosure.

1) The ranging apparatus 1 may be designed as a ranging device other than a LiDAR device. The emitted light may be light having a wavelength other than that of infrared light.

2) The shielding plate 49 may be firmly secured to the second portion 41.

3) The operations of the controller 3 in this embodiment may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium. The means for performing the functions of parts of the controller 3 need not necessarily include software, but may be realized one or a plurality of hardware devices.

4) The above functions performed by one of the component parts in the above embodiments may alternatively achieved by two or more of the component parts. One of the functions performed by each of the component parts may be achieved by a combination of two or more of the component parts. The functions performed by two or more of the component parts may be achieved by a specified one of the component sparts. At least one of the component parts in each of the above embodiment may be omitted or replaced with that in another embodiment.

5) The above described ranging apparatus 1, a system including the ranging apparatus 1, computer-executed programs constituting the controller 3, a non-transitory computer-readable recording medium, such as a semiconductor memory, which retains the programs therein, a ranging method, a production method of the ranging apparatus may realize this disclosure.

What is claimed is:

1. A ranging apparatus which measures a distance to an object, comprising:

an emitter which emits light;

a receiver which receives reflected light which arises from reflection of the emitted light on the object;

a housing which is configured to have the emitter and the receiver disposed therein;

an optical window which is provided in the housing and through which the emitted light and the reflected light are transmissible;

a heater which works to supply heat to the optical window;

an outlet hole which is formed in the housing;

a power conductor which is connected to the heater and extends outside the housing through the outlet hole; and a guide which is disposed in the housing and works to guide the power conductor toward the outlet hole, wherein the guide is equipped with a cover which covers at least a portion of the power conductor and reflects the emitted light and the reflected light less than the power conductor does.

2. The ranging apparatus as set forth in claim 1, wherein the housing includes a metallic portion made from metal, and the guide is equipped with a shield which blocks light traveling from the optical window toward the metallic portion.

3. The ranging apparatus as set forth in claim 1, wherein the optical window includes an emitting window through which the emitted light is transmissible and a receiving window through which the reflected light is transmissible to the receiver, and the guide includes a dividing portion which divides an inside of the housing into a region where the emitting window exists and a region where the receiving window exists.

\* \* \* \* \*